United States Patent [19]
Riefe et al.

[11] Patent Number: 5,706,704
[45] Date of Patent: Jan. 13, 1998

[54] ENERGY ABSORBING STEERING COLUMN FOR MOTOR VEHICLE

[75] Inventors: Richard Kremer Riefe, Saginaw; Howard David Beauch, Frankenmuth; David Michael Byers, Saginaw; Michael Patrick Anspaugh, Bay City, all of Mich.

[73] Assignee: General Motors Corporation, Detroit, Mich.

[21] Appl. No.: 621,854

[22] Filed: Mar. 25, 1996

[51] Int. Cl.[6] ........................................ B62D 1/19
[52] U.S. Cl. .................... 74/493; 74/492; 188/371; 280/777
[58] Field of Search ............... 74/492, 493; 280/777, 280/779; 188/371, 372

[56] References Cited

U.S. PATENT DOCUMENTS

| | | | |
|---|---|---|---|
| 4,117,741 | 10/1978 | Yazane et al. | 74/492 |
| 4,733,575 | 3/1988 | Nakamura | 74/493 |
| 4,838,576 | 6/1989 | Hamasaki et al. | 280/777 |
| 4,901,592 | 2/1990 | Ito et al. | 74/492 |
| 4,915,412 | 4/1990 | Yuzuriha et al. | 280/777 X |
| 4,989,898 | 2/1991 | Yamaguchi et al. | 280/777 |
| 5,052,716 | 10/1991 | Matsumoto | 280/777 |
| 5,286,056 | 2/1994 | Speich | 280/777 |
| 5,375,881 | 12/1994 | Lewis | 280/777 |
| 5,497,675 | 3/1996 | Brown et al. | 74/492 |

*Primary Examiner*—Charles A. Marmor
*Assistant Examiner*—Troy Grabow
*Attorney, Agent, or Firm*—Saul Schwartz

[57] ABSTRACT

An energy absorber for a motor vehicle steering column including a yoke pivotable about a lateral centerline of a motor vehicle body and an energy absorbing means between the yoke and the mast jacket responsive to linear translation of the mast jacket relative to the yoke. The mast jacket extends through a bore in the yoke and a plastic bushing in the bore prevents the mast jacket from tilting relative to the yoke before and during linear translation of the mast jacket. The energy absorbing means includes a flat metal strap attached at one end to the mast jacket and bent over a convex anvil on the yoke. The metal strap is pulled over the anvil parallel to a longitudinal centerline of the mast jacket and plastically deformed to convert into work a fraction of the kinetic energy of an impact on the steering column. Because the mast jacket pivots as a unit with the yoke, the metal strap is always parallel to the longitudinal centerline of the mast jacket and the vector force reaction on the mast jacket attributable to the energy absorber intersects the lateral centerline.

6 Claims, 3 Drawing Sheets

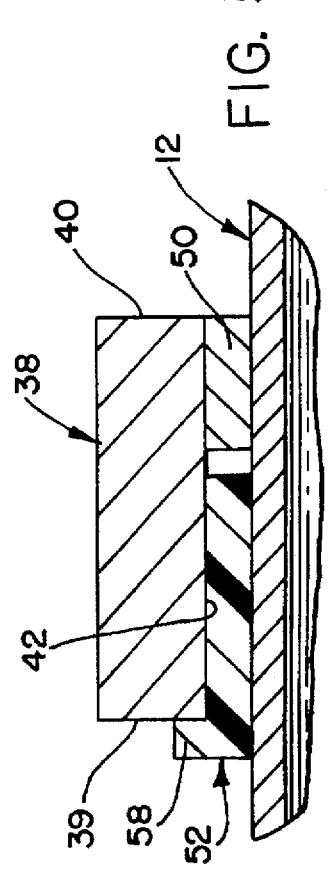
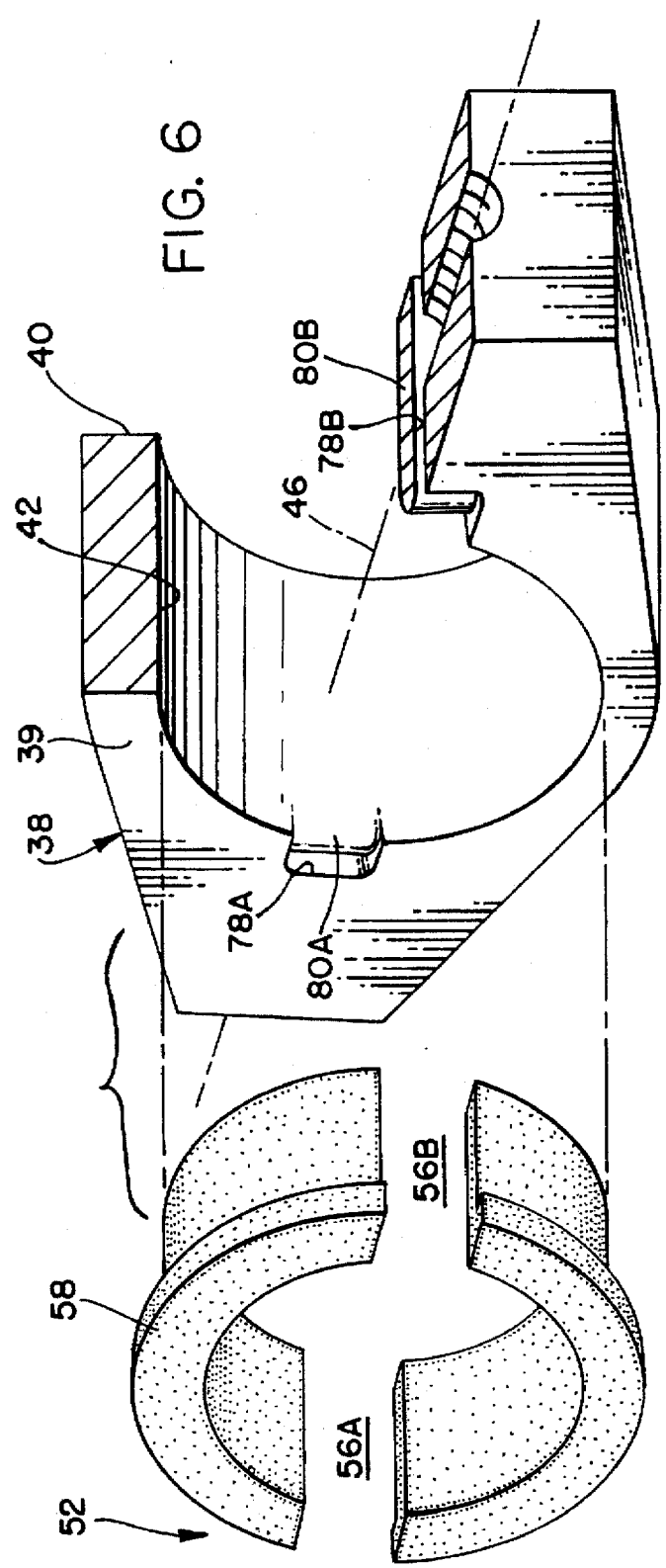

1

ENERGY ABSORBING STEERING COLUMN FOR MOTOR VEHICLE

FIELD OF THE INVENTION

This invention relates to energy absorbing columns for motor vehicles.

BACKGROUND OF THE INVENTION

A previously known energy absorber of simple construction for a motor vehicle steering column consists of a convex anvil on the steering column near the upper end thereof and a stationary flat metal strap having a concave web seated against the convex anvil. During linear translation of the steering column under impact, the concave web of the metal strap moves wave-like along the length of the metal strap effecting concurrent plastic deformation of the latter to convert into work a fraction of the kinetic energy of the impact. The placement of the energy absorber near the upper end of the steering column consumes space on the vehicle in an already congested environment. Further, it is desirable from a performance standpoint that parallelism exist between the metal strap and the direction of linear translation of the steering column both before and during linear translation of the steering column under impact. It is difficult to maintain such parallelism where the steering column is raked or rake adjustable, i.e. pivotable up and down about a center at the bottom of the steering column for adjustment of the vertical position of a steering wheel, or where the steering column is not positively guided during linear translation under impact.

SUMMARY OF THE INVENTION

This invention is a new and improved energy absorber for a motor vehicle steering column including a yoke supported on a body of the motor vehicle for pivotal movement about a lateral centerline of the body and an energy absorbing means between the yoke and the mast jacket responsive to linear translation of the mast jacket under impact relative to the yoke to convert into work a fraction of the kinetic energy of the impact. The mast jacket extends through a bore in the yoke and a plastic bushing in the bore prevents the mast jacket from tipping relative to the yoke before and during linear translation. The energy absorbing means includes a convex anvil on the yoke and a J-shaped flat metal strap having a concave web seated on the convex anvil and a short leg rigidly attached to the mast jacket. The metal strap is pulled over the convex anvil parallel to a longitudinal centerline of the mast jacket during linear translation of the mast jacket to plastically deform the metal strap and thereby convert into work a fraction of the kinetic energy of the impact on the steering column. Because the mast jacket pivots as a unit with the yoke about the lateral centerline, the metal strap and its vector force reaction on the mast jacket remain parallel to the longitudinal centerline of the mast jacket before and during linear translation of the mast jacket. In a preferred embodiment, two of the aforesaid energy absorbing means are disposed symmetrically on opposite sides of the mast jacket.

BRIEF DESCRIPTION OF THE DRAWINGS

FIG. 5 is a view taken generally along the plane indicated by lines 5—5 in FIG. 2; and FIG. 6 is a fragmentary, exploded perspective view of the energy absorber according to this invention.

DESCRIPTION OF A PREFERRED EMBODIMENT

Figure 1:
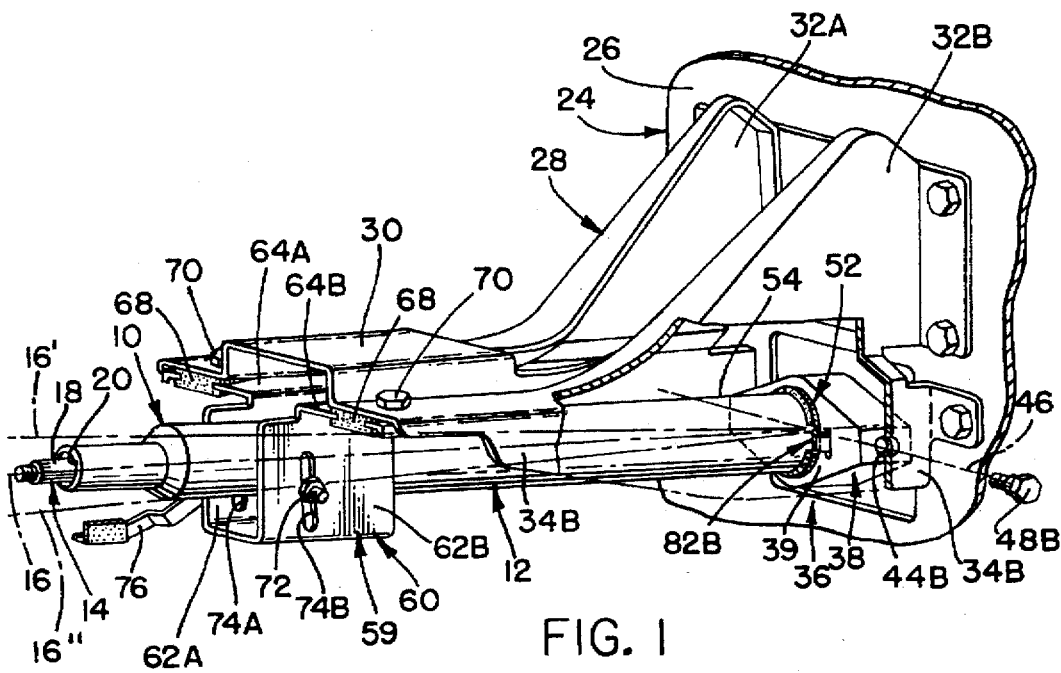
FIG. 1 is a fragmentary perspective view of a motor vehicle steering column having an energy absorber according to this invention.
Figure 2:
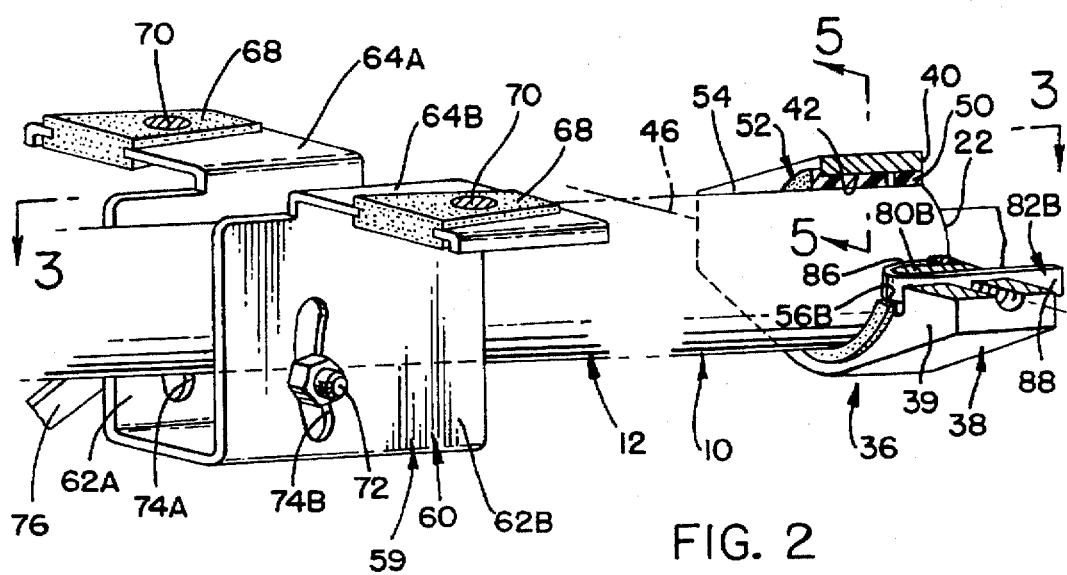
FIG. 2 is an enlarged, partially broken-away view of a portion of FIG. 1.
Figure 3:
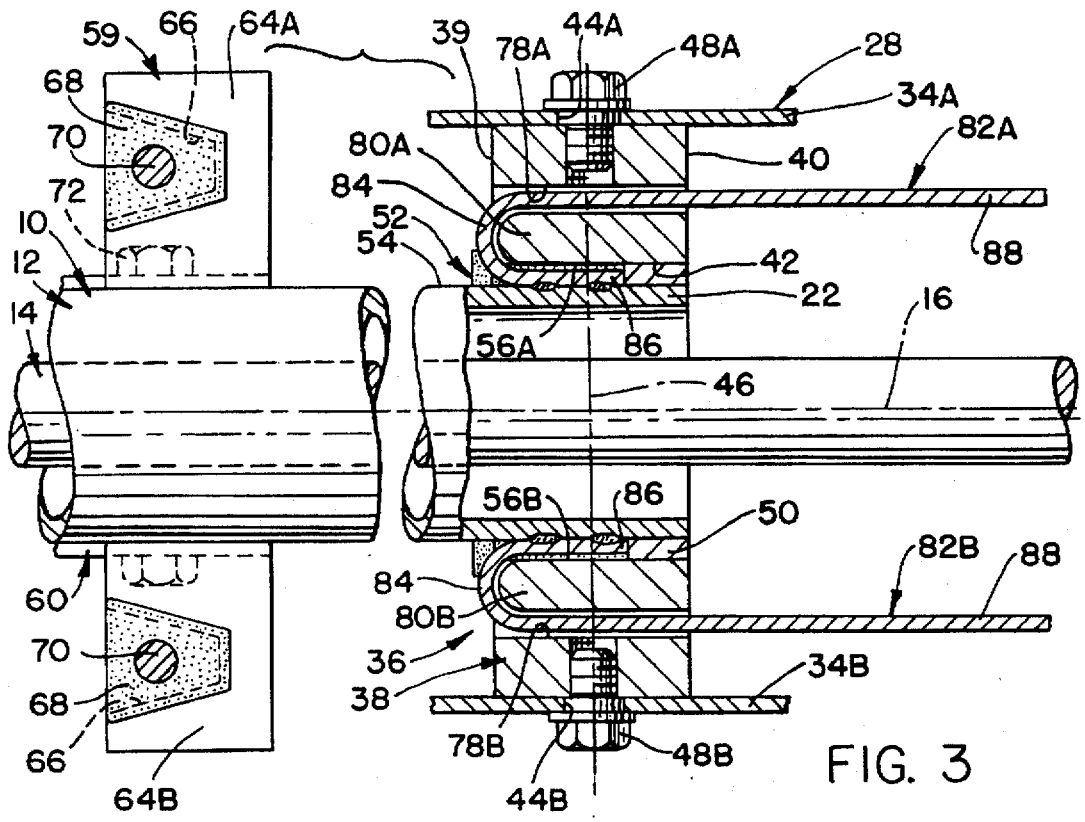
FIG. 3 is a sectional view taken generally along the plane indicated by lines 3—3 in FIG. 2.
Figure 4:
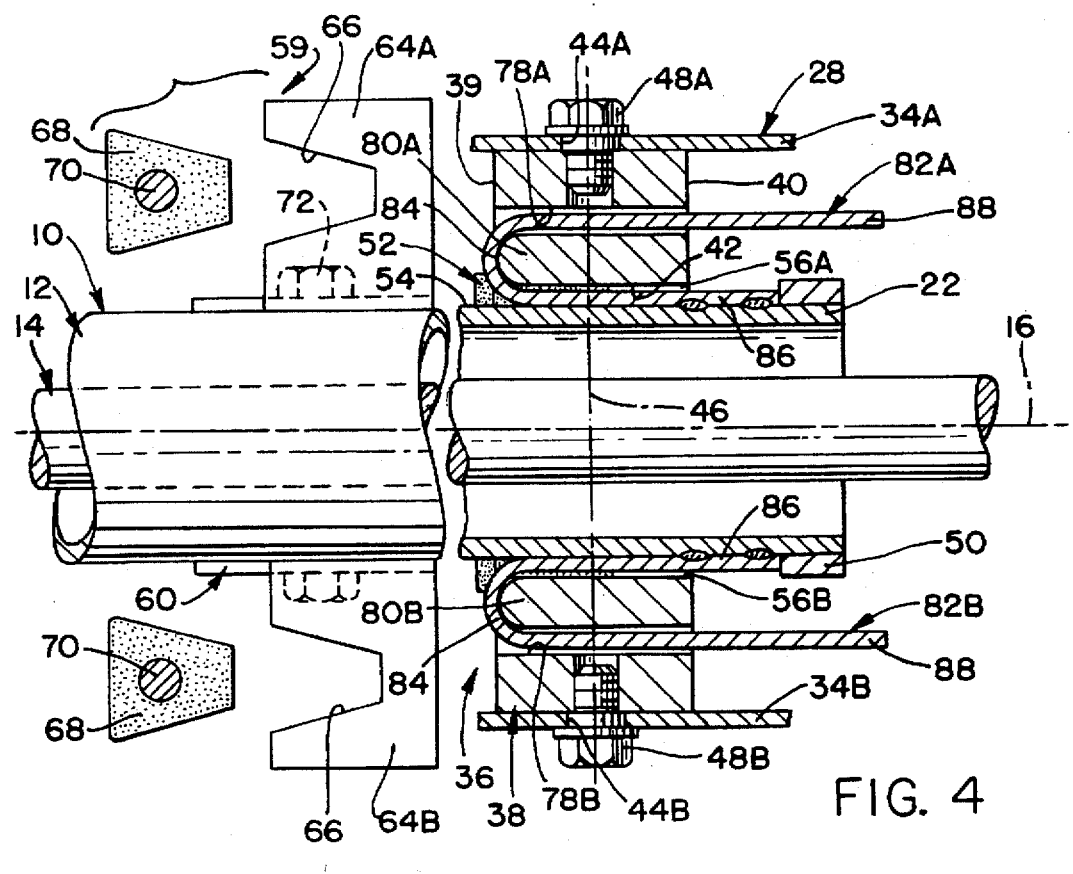
FIG. 4 is similar to FIG. 3 showing elements of the energy absorber according to this invention in different relative positions.

Referring to FIG. 1, a motor vehicle steering column 10 includes a tubular mast jacket 12 and a steering shaft 14 supported on the mast jacket for rotation about a longitudinal centerline 16 of the steering column and of the mast jacket and for translation as a unit with the mast jacket in the direction of the longitudinal centerline 16. The steering shaft 14 has an upper end 18 protruding beyond an upper end 20 of the mast jacket 12 and a lower end, not shown, protruding beyond a lower end 22, FIGS. 3-4, of the mast jacket 12. A steering wheel, not shown, is rigidly attached to the upper end 18 of the steering shaft.

A fragmentarily illustrated body structure 24, FIG. 1, of the motor vehicle includes a vertical panel 26 at the forward extremity of a passenger compartment of the motor vehicle and a bracket 28 bolted to the vertical panel. The bracket 28 includes a horizontal panel 30 and a pair of integral supports 32A-32B. The horizontal panel 30 is flanked on opposite sides by a pair of depending vertical sides 34A-34B of the bracket 28 integral with the horizontal panel and with the supports 32A-32B, respectively.

An energy absorber 36 according to this invention is disposed between the body structure of the motor vehicle and the steering column 10 and includes a yoke 38 having a first side 39 facing the upper end of the mast jacket, an opposite second side 40, and a bore 42 between the first and second sides. A pair of apertures 44A-44B, FIGS. 3-4, in the vertical sides 34A-34B, respectively, of the bracket 28 are aligned on a lateral centerline 46 of the body structure of the motor vehicle. A pair of bolts 48A-48B protrude through the apertures 44A-44B, respectively, into threaded holes in opposite ends of the yoke 38. Plain cylindrical shoulders on the bolts 48A-48B fit closely in the apertures 44A-44B so that the bolts define a pair of trunnions supporting the yoke 38 on the body structure 24 for pivotal movement about the lateral centerline 46.

The mast jacket 12 is disposed in the bore 42 in the yoke with the longitudinal centerline 16 intersecting the lateral centerline 46. An annular collar 50 is rigidly attached to the mast jacket 12 at its lower end 22 and interference fitted in the bore 42. A split, cylindrical plastic bushing 52 fills the annulus between an outside cylindrical wall 54 of the mast jacket 12 and the bore 42 except for a diametrically opposite pair of slots 56A-56B, FIG. 6, defined between the split segments of the bushing. A lip 58 of the plastic bushing 52 seats against the first side 39 of the yoke.

The interference fit between the collar 50 and the bore 42 and the plastic bushing 52 cooperate in preventing tipping of the mast jacket 12 relative to the yoke 38 and in uniting the yoke and the mast jacket for rake adjustment, i.e. up and down pivotal movement about a center at the bottom of the steering column, between upper and lower limit positions represented by positions 16' and 16" of the centerline 16 of the steering column, FIG. 1. During linear translation of the mast jacket 12 after the interference fit between the collar 50 and the bore 42 is severed, the plastic bushing 52 defines a slide bearing between the mast jacket 12 and the yoke 38 while continuing to prevent tipping of the mast jacket relative to the yoke. It is within the scope of this invention to prevent tipping of the mast jacket relative to the yoke by means other than the plastic bushing 52. For example, the bore 42 may be fitted closely around the mast jacket with only enough running clearance for easy linear translation of the mast jacket relative to the yoke.

A schematically represented clamp 59 is disposed between the bracket 28 and the mast jacket 12 and includes a box-shaped bracket 60 having a pair of vertical sides 62A–62B on opposite sides of the mast jacket and a pair of horizontal flanges 64A–64B extending outward from the vertical sides 62A–62B, respectively. Each of the flanges 64A–64B has a notch 66, FIG. 4, open toward the upper end 20 of the mast jacket in which is received a capsule 68. The capsules are retained in the notches 66 by plastic shear pins, not shown, and have openings through which a pair of hanger bolts 70 extend. A nut, not shown, on each hanger bolt 70 clamps the corresponding capsule 68 to the horizontal panel 30 of the bracket 28.

The clamp 59 further includes a cross bolt 72 on the mast jacket 12 projecting through a pair of vertical slots 74A–74B in the vertical sides 62A–62B and a lever 76 which rotates the cross bolt. When the cross bolt 72 is loose between the vertical sides 62A–62B, the mast jacket 12 is rake adjustable. When the cross bolt 72 is tight between the vertical sides 62A–62B, the mast jacket 12 is rigidly clamped to the box-shaped bracket 60.

An energy absorbing means of the energy absorber 36 includes a pair of passages 78A–78B through the yoke 38 on opposite sides of the bore 42 parallel to and coplanar with the slots 56A–56B defined between the segments of the split plastic bushing 52. The portions of the first side 39 of the yoke 38 between the passages 56A–56B and the bore 42 are rounded or nosed to define a pair of convex anvils 80A–80B on the yoke facing the upper end of the mast jacket 12.

A pair of flat, rectangular metal straps 82A–82B of the energy absorbing means are bent generally in the shape of a "J". Each metal strap includes a concave web 84 matching and bearing against one of the convex anvils 80A–80B, a short leg 86 in a corresponding one of the slots 56A–56B between the segments of the split plastic bushing 52, and a long leg 88 in a corresponding one of the passages 78A–78B in the yoke. Each of the short legs 86 is rigidly attached to the outside cylindrical wall 54 of the mast jacket by spot welding or the like.

Because the passages 78A–78B and the slots 56A–56B are in the plane of the lateral centerline 46 and parallel to the longitudinal centerline 16, and because the plastic bushing 52 prevents tipping of the mast jacket 12 relative to the yoke 38, the metal straps 82A–82B are maintained parallel to the direction of linear translation of the mast jacket prior to the onset of such linear translation regardless of the selected position of the steering column between its upper and lower limit positions 16'–16". Further, because the energy absorber 36 is in heretofore unused space at the bottom of the steering column 10, instead of in the congested environment near the upper end of the steering column, valuable space is made available for other components of the motor vehicle.

When the aforesaid steering wheel on the upper end 18 of the steering shaft 14 is impacted toward the vertical panel 26, the aforesaid plastic shear pins fracture and the collar 50 is dislodged from the bore through the second side 40 of the yoke to release the mast jacket for linear translation in the direction of the longitudinal centerline 16. As the mast jacket 12 plunges through the bore 42 in the yoke, it pulls the short leg 86 of each of the metal straps 82A–82B parallel to the longitudinal centerline 16 while the passages 78A–78B prevent the long legs 88 from escaping parallelism with the short legs 86 without inhibiting translation of the long legs through the passages 78A–78B. Accordingly, the metal straps 82A–82B are pulled over the convex anvils 80A–80B with the concave webs 84 held tightly against the convex anvils so that the metal straps are continuously plastically deformed by being bent through substantially 180° to convert into work a fraction of the kinetic energy of the impact on the steering wheel.

Because the yoke 38 pivots up and down with the mast jacket, the metal straps 82A–82B and their vector force reactions on the mast jacket remain parallel to the longitudinal centerline 16. In addition, because the vector force reactions on the mast jacket attributable to the metal straps 82A–82B intersect the lateral centerline 46, the mast jacket 12 is not subjected to overturning moments which otherwise might bind the mast jacket 12 in the bore 42 during linear translation. Similarly, the symmetric array of the metal straps 82A–82B and the convex anvils 80A–80B on opposite sides of the mast jacket 12 prevents binding of the mast jacket in the bore 42 during linear translation.

We claim:

1. An energy absorber for a motor vehicle steering column comprising:

a steering column mast jacket having a longitudinal centerline, a yoke mounted on a body structure of said motor vehicle for pivotal movement about a lateral centerline of said body structure, a bore in said yoke around said steering column mast jacket, means operative to mount said mast jacket in said bore in said yoke for linear translation in said bore relative to said yoke in the direction of said longitudinal centerline of said mast jacket and to prevent tipping of said mast jacket in said bore relative to said yoke before and during relative linear translation of said mast jacket in said bore, and an energy absorbing means connected to said mast jacket and to said yoke, said energy absorbing means being operative in response to linear translation of said mast jacket in said bore relative to said yoke in the direction of said longitudinal centerline of said mast jacket induced by an impact on said steering column to convert into work a fraction of the kinetic energy of said impact on said steering column.

2. The energy absorber recited in claim 1 wherein said energy absorbing means connected to said mast jacket and to said yoke comprises:

a first passage in said yoke parallel to said longitudinal centerline of said mast jacket, a second passage in said yoke parallel to said first passage and spaced radially outboard of said first passage relative to said longitudinal centerline of said mast jacket, a convex anvil on said yoke between said first passage and said second passage, a J-shaped flat metal strap including a concave web bearing against said convex anvil and a first leg in said first passage in said yoke and a second leg in said second passage in said yoke, and a rigid connection between said mast jacket and said first leg of said metal strap so that said metal strap is pulled over said convex anvil by said mast jacket during linear translation of said mast jacket to plastically deform said metal strap and convert into work a fraction of the kinetic energy of said impact on said steering column and said second passage confines said second leg so that said concave web is held against said convex anvil during linear translation of said mast jacket relative to said yoke.

3. The energy absorber recited in claim 2 wherein said means operative to permit linear translation of said mast jacket relative to said yoke through said bore in the direction of said longitudinal centerline of said mast jacket and to prevent tipping of said mast jacket relative to said yoke comprises:

a plastic bushing in said bore in said yoke closely received around an outside wall of said mast jacket.

4. The energy absorber recited in claim 3 wherein:

said outside wall of said mast jacket is a cylindrical outside wall, and said plastic bushing is a cylindrical plastic bushing on said yoke substantially filling an annulus between said outside cylindrical wall of said mast jacket and said bore in said yoke and including a slot parallel to said longitudinal centerline of said steering column which defines said first passage on said yoke.

5. The energy absorber recited in claim 4 further comprising:

an annular collar rigidly attached to said mast jacket at a lower end thereof received in said bore in said yoke with an interference fit.

6. The energy absorber recited in claim 3 further comprising:

a third passage in said yoke parallel to said longitudinal centerline of said mast jacket and symmetrically opposite said first passage, a fourth passage in said yoke parallel to said third passage and symmetrically opposite said second passage, a second convex anvil on said yoke between said third passage and said fourth passage, a second J-shaped flat metal strap including a concave web bearing against said second convex anvil and a first leg in said third passage in said yoke and a second leg in said fourth passage in said yoke, and a rigid connection between said mast jacket and said first leg of said second metal strap so that said second metal strap is pulled over said second convex anvil by said mast jacket during linear translation of said mast jacket to plastically deform said second metal strap and convert into work a further fraction of the kinetic energy of said impact on said steering column and said fourth passage confines said second leg of said second metal strap so that said concave web thereof is held against said second convex anvil during linear translation of said mast jacket relative to said yoke.

\* \* \* \* \*